United States Patent

Nakajima

[11] Patent Number: 5,911,010
[45] Date of Patent: *Jun. 8, 1999

[54] IMAGE COMMUNICATION APPARATUS AND IMAGE PROCESSING APPARATUS

[75] Inventor: Toshifumi Nakajima, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/742,645

[22] Filed: Nov. 1, 1996

Related U.S. Application Data

[63] Continuation of application No. 08/351,057, Nov. 29, 1994, abandoned, which is a continuation of application No. 08/098,860, Jul. 29, 1993, abandoned.

[30] Foreign Application Priority Data

Jul. 30, 1992 [JP] Japan ..................... 4-203890

[51] Int. Cl.$^6$ ............... G06T 9/00; H04N 1/41
[52] U.S. Cl. ....................... 382/239; 358/430
[58] Field of Search .................. 382/239, 240, 382/244, 245, 247, 248, 250, 232; 358/430, 261.2, 261.1, 261.3, 432, 433, 426

[56] References Cited

U.S. PATENT DOCUMENTS

| | | | |
|---|---|---|---|
| 4,150,400 | 4/1979 | Wong | 358/261.1 |
| 4,542,411 | 9/1985 | Imanaka | 382/56 |
| 4,725,885 | 2/1988 | Gonzales | 358/135 |
| 4,920,426 | 4/1990 | Hatori et al. | 358/430 |
| 5,014,198 | 5/1991 | Umemura | 382/56 |
| 5,046,119 | 9/1991 | Hoffert et al. | 382/239 |
| 5,157,488 | 10/1992 | Pennebaker | 348/404 |
| 5,157,743 | 10/1992 | Maeda et al. | 382/56 |
| 5,204,756 | 4/1993 | Chevion et al. | 358/426 |
| 5,271,072 | 12/1993 | Yoshida et al. | 382/56 |
| 5,321,522 | 6/1994 | Eschbach | 358/433 |
| 5,323,247 | 6/1994 | Parker et al. | 358/456 |
| 5,327,248 | 7/1994 | Miller | 358/261.4 |
| 5,333,212 | 7/1994 | Ligtenberg | 382/56 |
| 5,392,133 | 2/1995 | Nakajima | 358/468 |
| 5,392,362 | 2/1995 | Kimura et al. | 382/239 |
| 5,539,842 | 7/1996 | Schwartz | 382/232 |

FOREIGN PATENT DOCUMENTS 551012 7/1993 European Pat. Off. ......... H04N 1/41

OTHER PUBLICATIONS

Efficient Hybrid Coding Scheme for Color Facsimile, Katsuno et al., Electronic Information Communication Society Technical Report CS 91–96, 1991, pp. 13–20.

Journal of the Institute of Image Electronic Engineers of Japan; vol. 20, No. 1 (1991) "Progressive Build–Up Coding Scheme for Bi–level Images, JBIG algorithm"; pp. 41–49.

Primary Examiner—Scott Rogers
Attorney, Agent, or Firm—Fitzpatrick, Cella, Harper & Scinto

[57] ABSTRACT

There is disclosed a facsimile apparatus, which selects one of a binary hierarchical coding method called, e.g., a JBIG method and an irreversible coding method called, e.g, a JPEG method in units of pages upon continuous transmission of a plurality of pages of images and performs a communication of data coded by the selected method. The apparatus selects the irreversible coding mode to perform a communication when a user selects a photographic mode from an operation panel, and selects the hierarchical coding or irreversible coding method in accordance with the characteristics of image information of an original.

21 Claims, 13 Drawing Sheets

FIG. 8
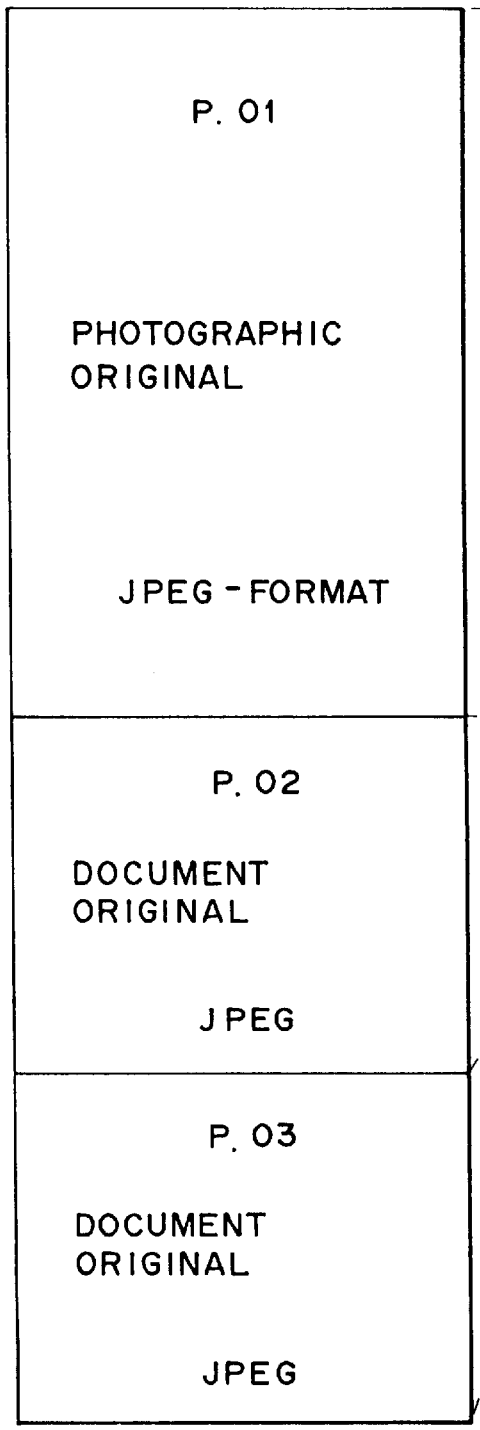
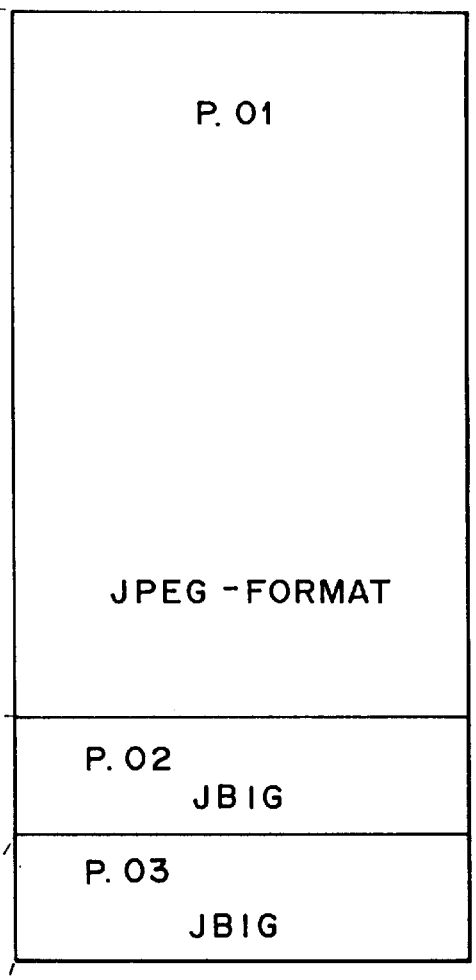

NUMERAL IS RESOLUTION [Pel/inch]
C: CODING   D: DECODING
R: RESOLUTION (REDUCTION)
E: RESOLUTION (ENLARGEMENT)

FIG. 10

| MSB | | | | | | | LSB |
|---|---|---|---|---|---|---|---|
| DL : initial layer to be transmitted ||||||||
| D : number of differential layers ||||||||
| P : number of bit-planes ||||||||
| Xd : horizontal image size at layer d ||||||||
| Xd  " ||||||||
| Xd  " ||||||||
| Xd  " ||||||||
| Yd : vertical image size at layer d ||||||||
| Yd  " ||||||||
| Yd  " ||||||||
| Yd  " ||||||||
| Lo : lines per stripe at lowest resolution ||||||||
| Mx : max horizontal offset allowed for AT pixel ||||||||
| My : max vertical offset allowed for AT pixel ||||||||
| --- | --- | --- | --- | HITOLO | SEQ | ILEAVE | |
| --- | | | | | | | |

\- - - : Reserved
HITOLO: high to low
SEQ : sequential
ILEAVE: interleave multiple bit-planes

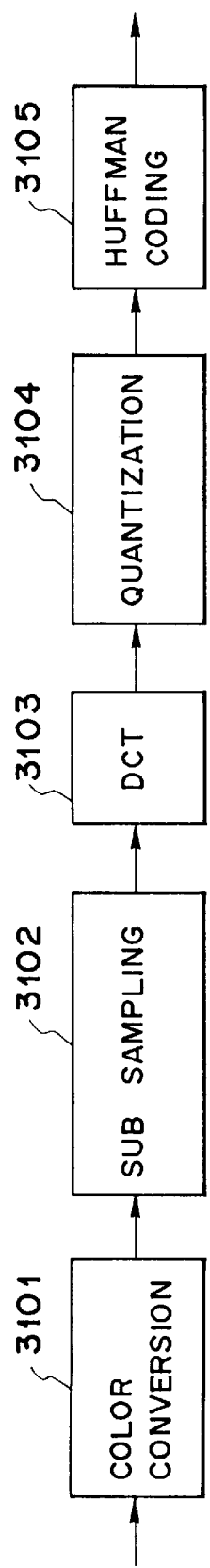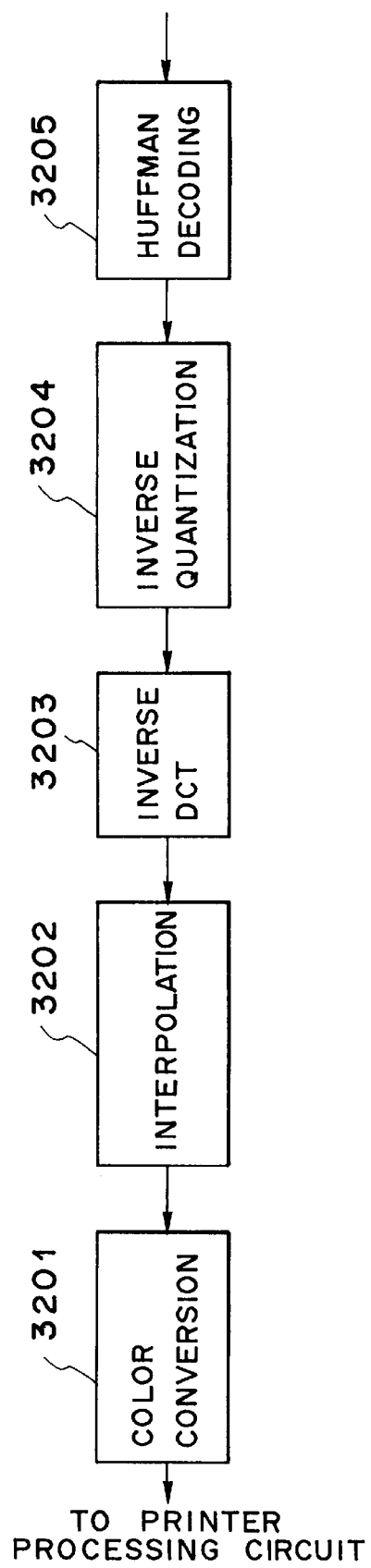

IMAGE COMMUNICATION APPARATUS AND IMAGE PROCESSING APPARATUS

This application is a continuation of application Ser. No. 08/351,057 filed on Nov. 29, 1994, abandoned, which is a continuation of prior application Ser. No. 08/098,860 filed on Jul. 29, 1993, abandoned.

BACKGROUND OF THE INVENTION

1. Field of the Invention

The present invention relates to an image communication apparatus and an image processing apparatus.

2. Related Background Art

A conventional facsimile apparatus (FAX) for transmitting/receiving a hierarchically coded image performs communications using MH, MR, and MMR coding methods. As a FAX for performing hierarchical coding in a near future, a FAX having a JBIG mode is proposed.

On the other hand, when a multi-value image, e.g., a color picture, is to be transmitted, a JPEG method, for example, is proposed as an irreversible coding method.

However, in the prior art, a problem is posed upon selection of JBIG or JPEG. More specifically, in a communication of a plurality of pages, if the first page alone is an original suitable for the JBIG method, and the remaining pages are originals suitable for the JPEG method, the communication is performed in the JBIG mode, and image quality undesirably deteriorates.

Such a problem is not limited to the above-mentioned JBIG mode but is commonly posed in binary hierarchical coding. Similarly, this problem is not limited to the JPEG method but is commonly posed in irreversible coding.

On the other hand, when encoders are arranged in correspondence with the JBIG and JPEG modes, the arrangement is undesirably complicated.

SUMMARY OF THE INVENTION

It is an object of the present invention to provide an image communication apparatus and an image processing apparatus, which can solve all or each of the above-mentioned problems.

It is another object of the present invention to improve ease to use of an image communication apparatus for performing image compression by an irreversible image coding method.

It is still another object of the present invention to provide an image communication apparatus for performing image compression by a binary hierarchical coding method.

In order to achieve the above objects, according to a preferred aspect of the present invention, there is disclosed an apparatus wherein, when a plurality of pages of images are continuously transmitted, one of binary hierarchical coding and irreversible coding methods is selected for each page, and data coded by the selected coding method is transmitted.

It is still another object of the present invention to provide an image communication apparatus for performing image compression by an arithmetical coding method.

It is still another object of the present invention to provide an image communication apparatus having novel functions.

It is still another object of the present invention to provide an image processing apparatus and an image communication apparatus suitable for transmitting color image data.

Other objects and features of the present invention will become apparent from the following description of the embodiments taken in conjunction with the accompanying drawings.

BRIEF DESCRIPTION OF THE DRAWINGS

FIG. 8 is an explanatory view of an image data quantity of the embodiment shown in FIG. 1;

FIG. 10 is a table showing a header added to data upon hierarchical coding;

FIG. 11 is a diagram showing an arrangement of a JPEG LSI 8 shown in FIG. 1;

FIG. 12 is a diagram showing an arrangement of the JPEG LSI 8 shown in FIG. 1;

DETAILED DESCRIPTION OF THE PREFERRED EMBODIMENTS

The preferred embodiments of the present invention will be described in detail hereinafter with reference to the accompanying drawings.

Figure 1:
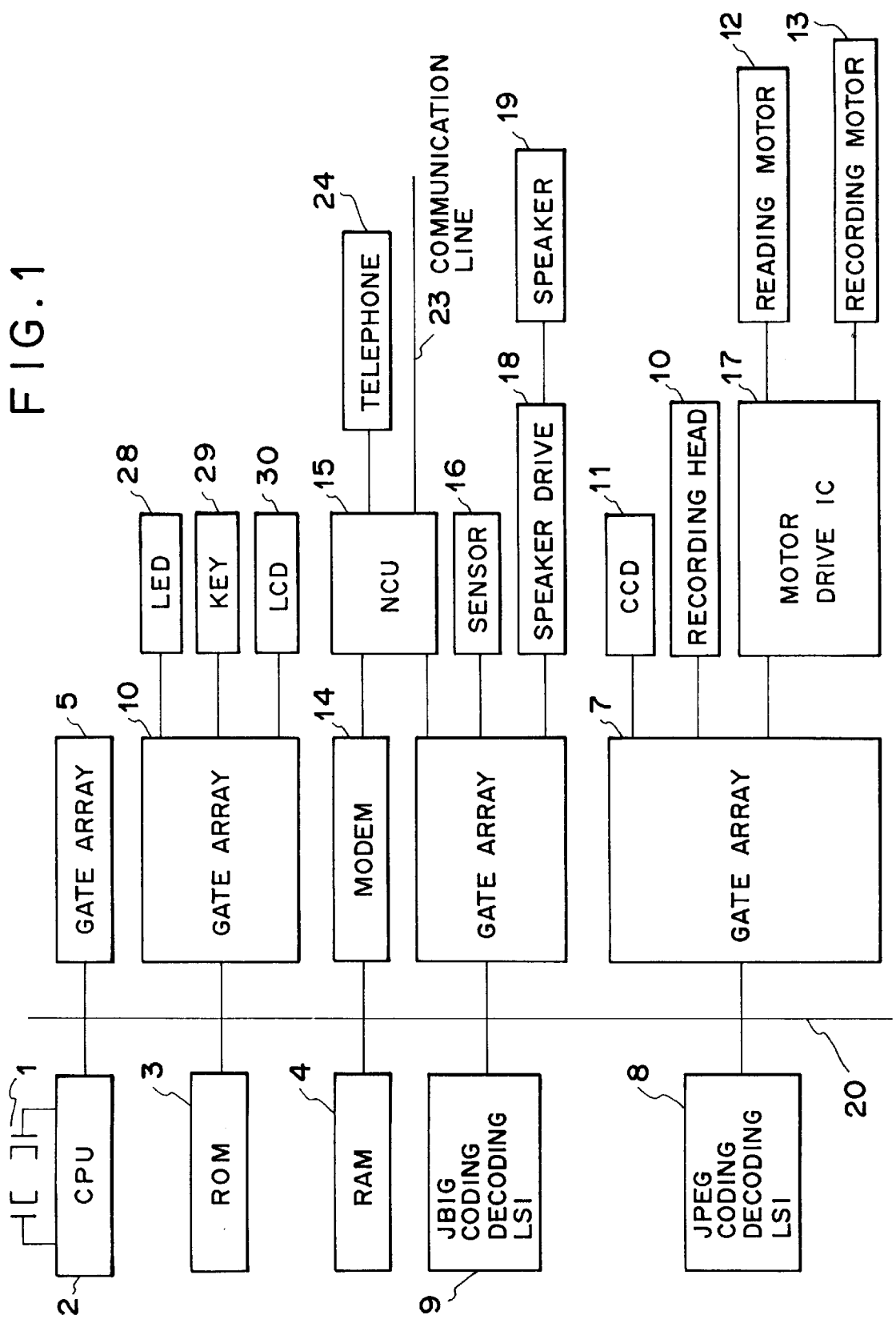
FIG. 1 is a block diagram showing an embodiment of the present invention.

FIG. 1 is a block diagram showing an arrangement of a facsimile apparatus as an image processing apparatus according to this embodiment. Referring to FIG. 1, a CPU 2 is connected to a ROM 3 and a RAM 4 via a bus 20, and controls the overall apparatus according to a control program stored in the ROM 3. The RAM 4 is used as a work area of the CPU 2. Note that the CPU 2 has a quartz oscillator 1 for generating its operation clocks.

In this apparatus, a reader unit for reading an original image is mainly constituted by a CCD line sensor 11 and a reading motor 12. An image recording unit is constituted by a recording head (thermal head) 10, a recording motor 13, and the like, and is used for recording a received image or a copy image. Note that the CCD line sensor 11 is a color line sensor, and outputs R, G, and B signal components. The recording head 10 comprises, e.g., a bubble jet recording head, and can record four colors, i.e., Y, M, C, and Bk.

A modem 14 modulates/demodulates image data and control procedure data, and is connected to a communication line 23 via an NCU 15. The NCU 15 holds a loop current of the communication line 23, performs line exchange with a telephone 24, and so on. The communication line may comprise a digital communication line such as an ISDN line. A hierarchical coding/decoding LSI (to be referred to as an LSI hereinafter) 9 performs processing to be described later ("C: coding processing" and "D: decoding processing" shown in FIG. 2). A JPEG coding/decoding LSI 8 for coding a multi-value color image performs orthogonal coding and nonlinear quantization of input multi-value color image data.

Figure 9:
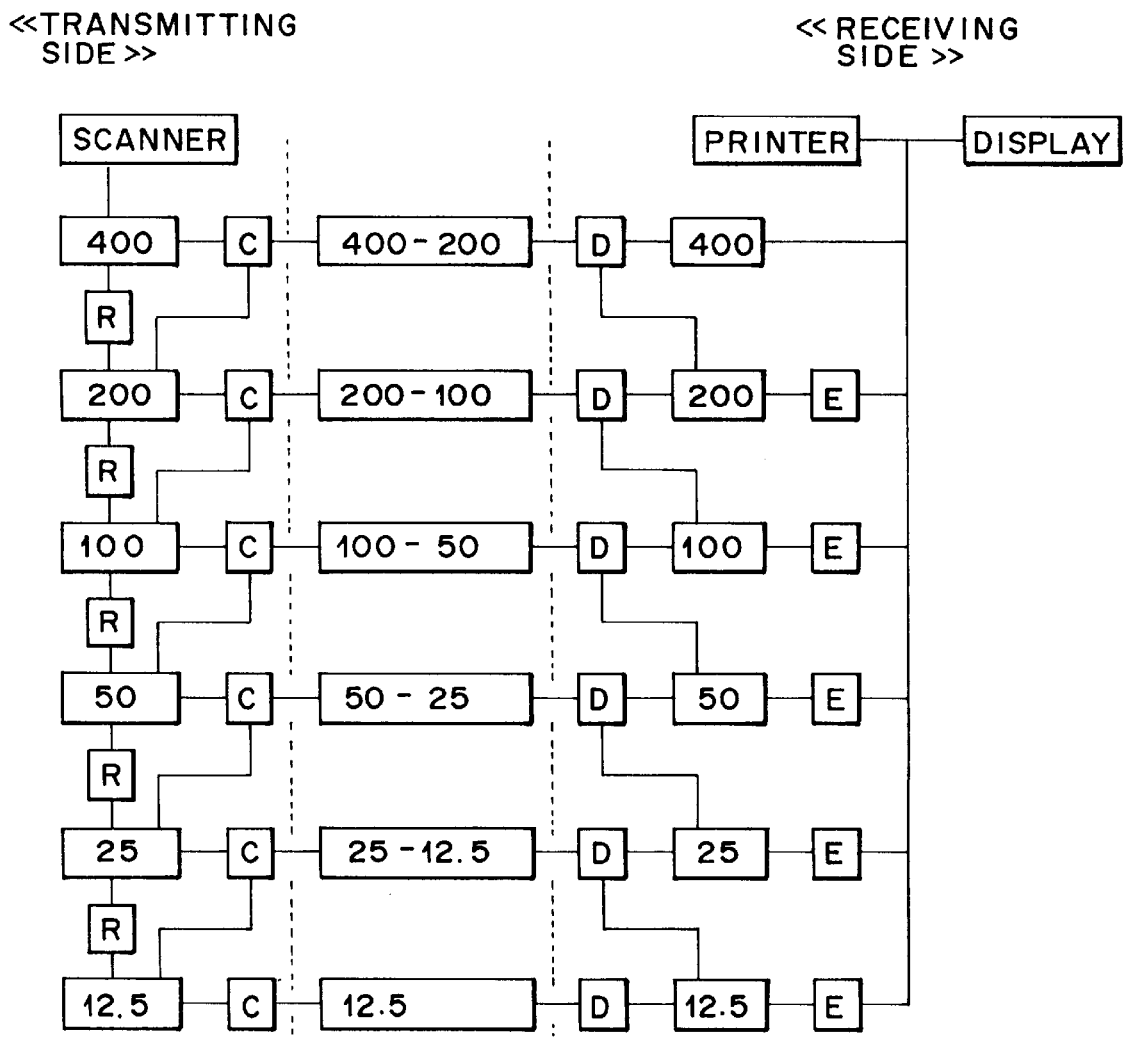
FIG. 9 is a chart for explaining hierarchical coding.

FIG. 9 is a chart showing the principle of hierarchical coding processing as a standardized model in the JBIG (Joint Bi-level Image Group). Referring to FIG. 9, the resolution of an original image is assumed to be 400 dpi or higher, and the transmitting side sequentially generates low-resolution images having ½ horizontal and vertical resolutions in correspondence with a required number of layers.

In the standardized model shown in FIG. 9 in the JBIG coding, the resolution of an original image is assumed to be 400 dpi, the number of layers is 6, the lowest resolution is assumed to be 12.5 dpi, and images having resolutions of 12.5 dpi and 25 dpi are displayed in a size of 3/16×3/16 of the original image, and are assumed to be used as icons.

The transmitting side codes and transmits an image having the lowest resolution. Then, the transmitting side codes information necessary for sequentially increasing the resolution. The receiving side decodes and reproduces images in the order from one having the lowest resolution, and displays images whose resolutions are sequentially increased, thus realizing a progressive display. The receiving side finally decodes and reproduces an original image free from deterioration. However, the receiving side can interrupt a communication at an image having an intermediate resolution as needed.

The header of hierarchical coding in this embodiment will be described below with reference to FIG. 10.

Referring to FIG. 10, DL represents an initial layer to be transmitted after hierarchical coding, D represents the number of layers to be transmitted as hierarchical codes other than a layer having the lowest resolution, and P represents the number of bit planes. Xd represents the number of pixels in the horizontal direction, and is expressed using 4 bytes. Yd represents the number of pixels in the vertical direction, and is expressed using 4 bytes as in Xd. Lo represents the number of lines constituting a stripe in a start layer, i.e., an initial layer to be transmitted, and Mx represents the maximum horizontal offset of a template used in coding. My represents the maximum vertical offset of a template used in coding. HIToLo is a bit indicating whether data is transmitted from high-resolution or low-resolution data upon execution of hierarchical transmission. SEQ is a bit indicating whether or not sequential transmission is performed. ILEAVE is a bit indicating whether or not data of a plurality of bit planes are interleaved.

As irreversible coding as a general compression method of a color multi-value image, a compression method based on an ADCT (Adaptive Discrete Cosine Transform) method recommended by the JPEG (Joint Photographic Expert Group) is known. The ADCT compression method will be described below.

FIG. 11 is a block diagram showing a functional arrangement of an ADCT compression device. A color space conversion unit 3101 converts a color space (NTSC-RGB) expressed by signals (red (R), green (G), and blue (B)) in units of colors of the NTSC system into a color space (YCrCb) expressed by a luminance signal Y and color difference signals Cr and Cb. A sub-sampling unit 3102 decreases the number of color difference data by utilizing the characteristics that human eyes are sensitive to luminance but are insensitive to color differences. More specifically, the sub-sampling unit 3102 calculates an average value of two adjacent color difference data, and decreases the quantity of color difference data to ½. A DCT conversion unit 3103 divides image data input via the sub-sampling unit 3102 into blocks each including 8×8 pixels which are adjacent in the horizontal and vertical directions, and DCT-converts these blocks into coefficients in a frequency space. A quantization unit 3104 divides 64 DCT coefficients with quantization values having different step widths. A Huffman coding unit 3105 classifies the quantized 64 DCT coefficients into one DC coefficient and 63 AC coefficients, and codes these coefficients in accordance with a Huffman table recommended by the JPEG. The coded data are added with a header including quantization table data, Huffman table data, and the like, and are stored in a memory or are transmitted to another apparatus.

FIG. 12 is a block diagram showing a functional arrangement of an ADCT expansion device. A Huffman decoding unit 3205 decodes input coded data to generate quantized data. An inverse quantization unit 3204 converts the quantized data generated by the Huffman decoding unit 3205 into DCT coefficient data. The DCT coefficient data are obtained by multiplying 64 coefficients with quantization values using the quantization table data used upon quantization by the quantization unit 3104. An inverse DCT conversion unit 3203 inversely DCT-converts DCT coefficient data obtained by the inverse quantization unit 3204 into actual image data. An interpolation unit 3202 interpolates Cr and Cb data omitted by the sub-sampling unit 3102 in data compression by a simple repetition method. A color space conversion unit 3201 converts YCrCb data into NTSC-RGB data or color space data of the device.

Figure 2:
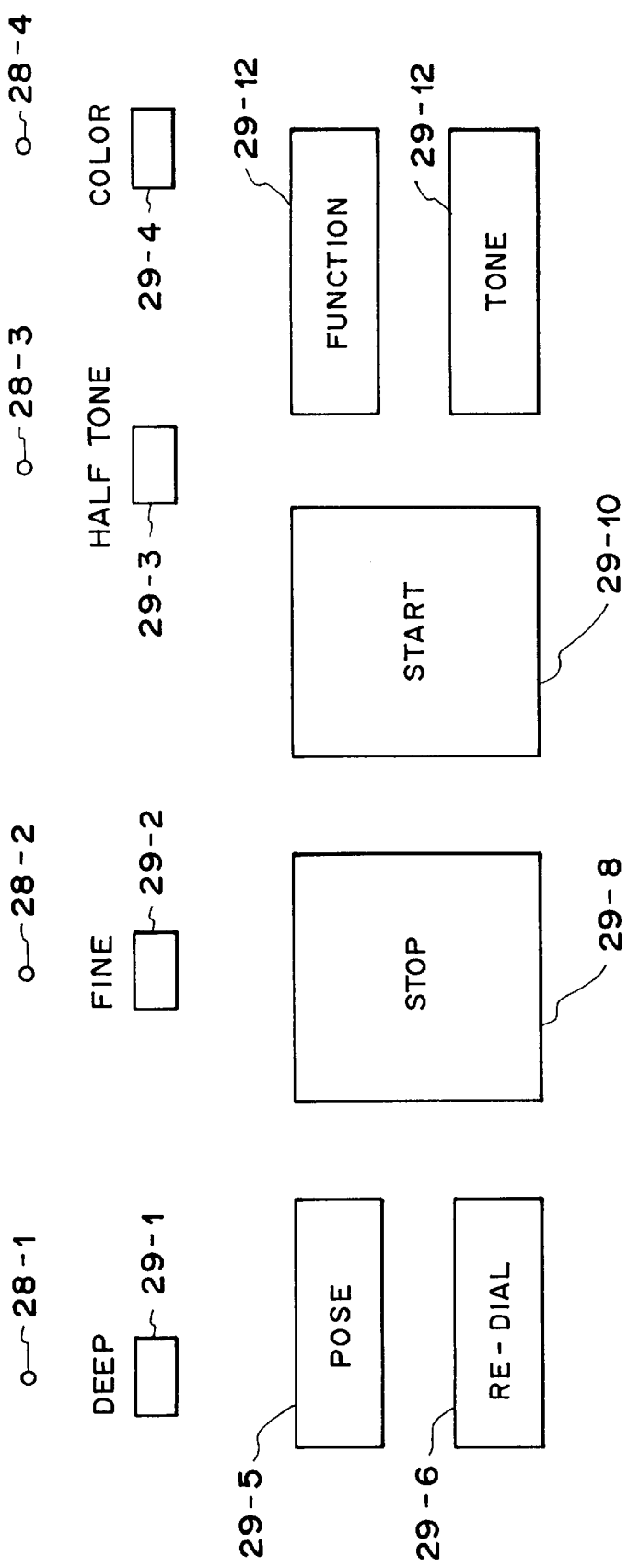
FIG. 2 is a view showing an outer appearance of an operation panel of the embodiment shown in FIG. 1 and a prior art.

An operation panel of the apparatus of this embodiment will be described below with reference to FIG. 2. The operation panel includes an LED 28, a key 29, and an LCD 30 shown in FIG. 1. Referring to FIG. 2, the details of the LED 28, the key 29, and the LCD 30 will be described by attaching suffices thereto.

Referring to FIG. 2, an instruction switch 29-1 is used for increasing the reading density.

A fine mode setting switch 29-2 is used for setting whether or not the reading resolution is set to be a high resolution, i.e., a fine mode is set.

A half tone setting switch 29-3 is used for setting processing suitable for a half tone image when an original image is read.

A color setting switch 29-4 is used for setting whether or not color image reading is performed when an original image is read.

A pause key 29-5 is used for setting a pause state.

A re-dial key 29-6 is turned on when a re-dial mode (repetitive dialing mode) is set.

A stop key 29-8 is used for stopping an image communication.

A start key 29-10 is used for starting an image communication.

A function key 29-12 is used for setting a function mode.

A tone key 29-14 is used for setting a tone level.

Although not shown, a ten-key pad for inputting, e.g., a telephone number is provided to the operation panel. LEDs 28-1 to 28-4 are arranged in correspondence with the keys 29-1 to 29-4.

Figure 3:
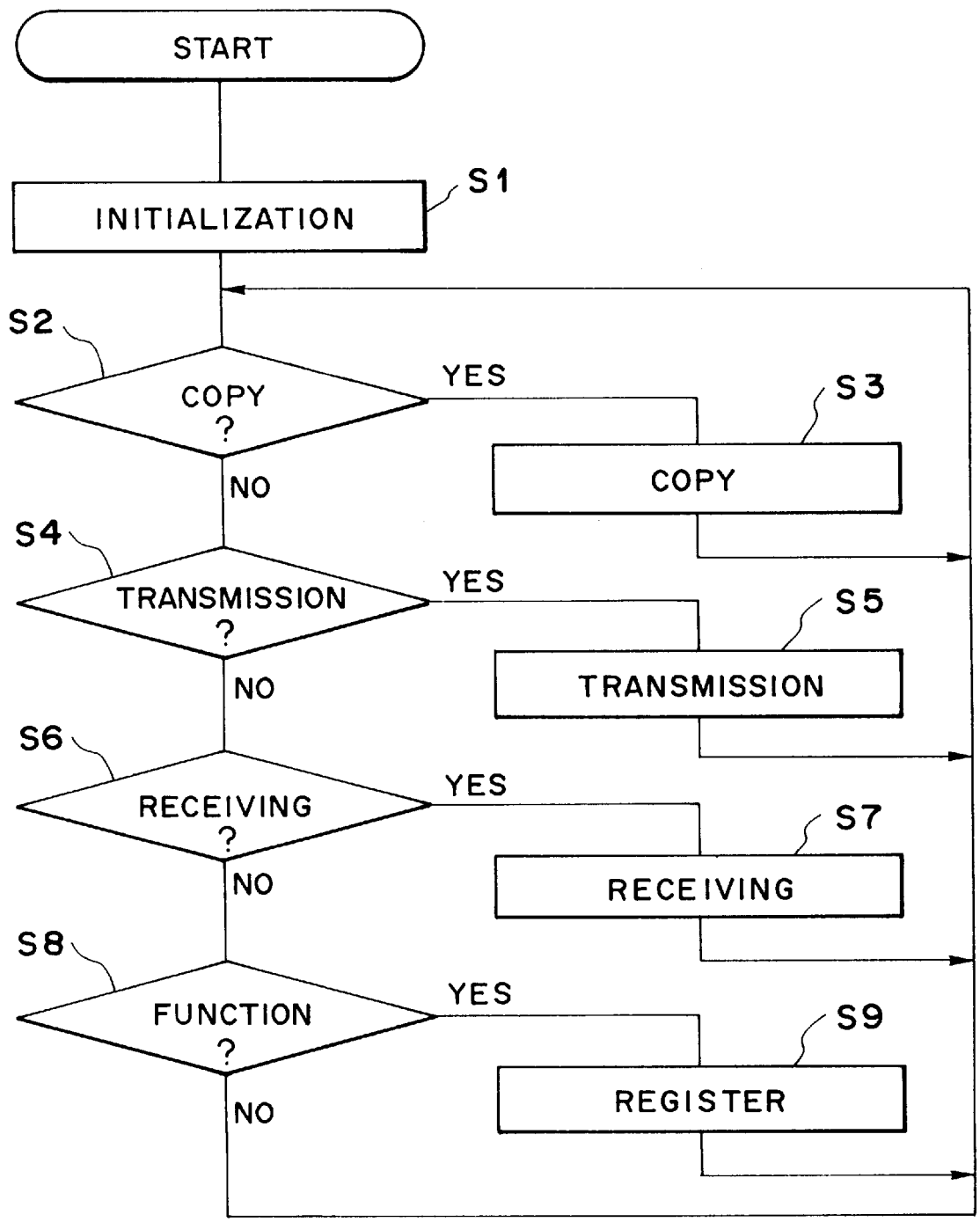
FIG. 3 is a flow chart showing an operation of the embodiment shown in FIG. 1.

FIG. 3 is a flow chart showing an operation of this embodiment. Referring to FIG. 3, when the power switch of the FAX is turned on, parameters are initialized in step S1, and the control waits for starting while circulating a loop consisting of step S2→step S4→step S6→step S8→step S2.

Figure 4:
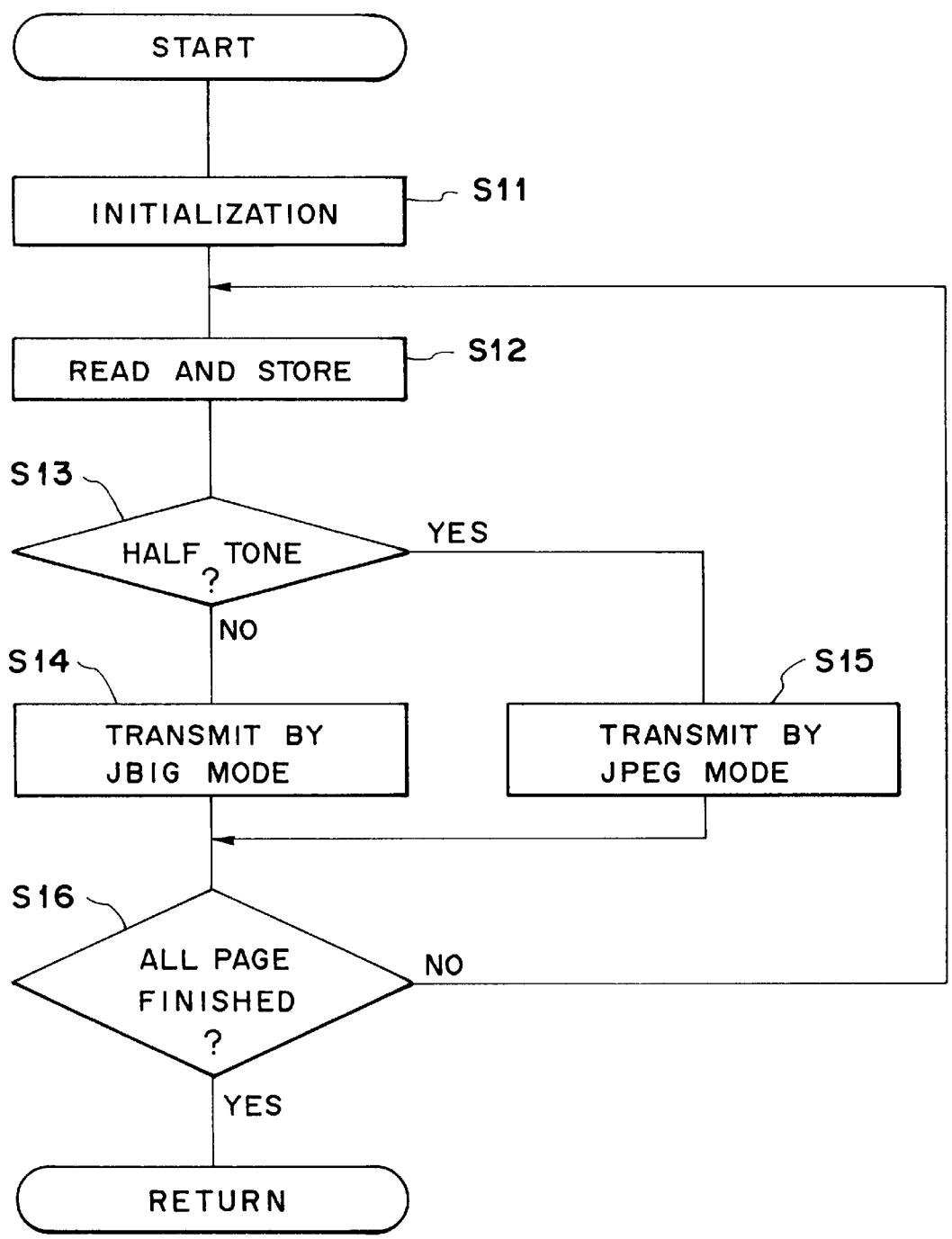
FIG. 4 is a flow chart showing an operation of the embodiment shown in FIG. 1.

If it is determined in step S4 that an original is set on the FAX, and the key 29-10 is depressed to start transmission, the CPU 2 detects this operation via a gate array 10, and the flow branches from step S4 to step S5. FIG. 4 is a flow chart showing the details in step S5. In step S11, parameters are initialized. In step S12, an original is read and stored in a memory. In a black/white mode, image data obtained from an original upon reading of the original is stored in the form of 64-level half tone data, and in a color mode, image data is stored in the form of RGB color mode. The flow then advances from step S12 to step S13, and it is checked if the half tone mode is set by the key 29-3 shown in FIG. 2. If YES in step S13, the flow advances to step S16 via step S15; otherwise, the flow advances to step S16 via step S14. In step S14, coding is performed in the JBIG mode; in step S15, coding is performed in the JPEG mode. It is checked in step S16 if all pages are finished. The flow returns from step S16 to step S12 until all pages are finished. A loop consisting of step S12→step S13→step S14/S15→step S16 is circulated by the number of set originals×the number of destinations, and if transmission is finished, the flow returns from step S16 to the main routine.

Figure 5:
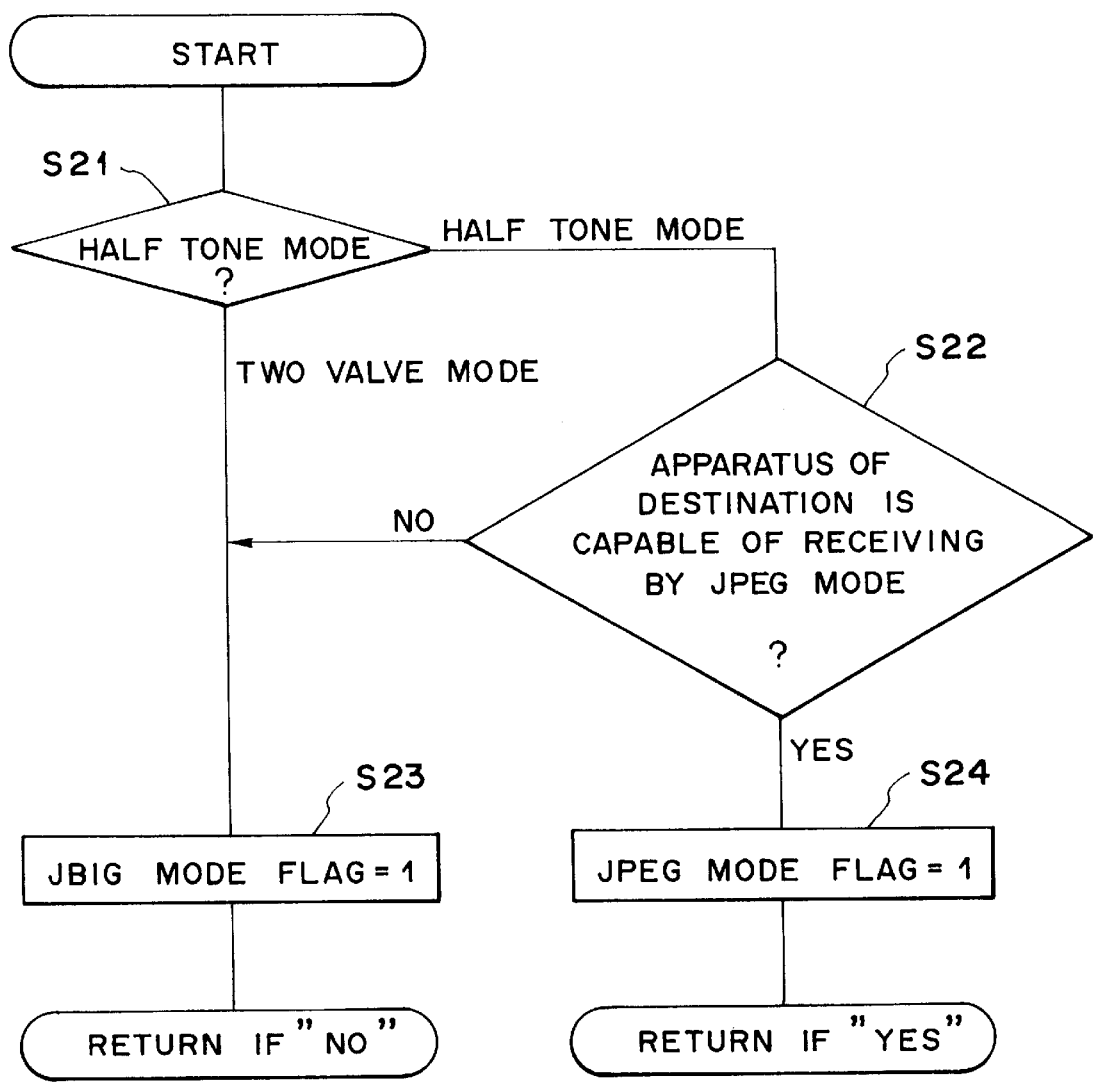
FIG. 5 is a flow chart showing an operation of the embodiment shown in FIG. 1.

FIG. 5 is a flow chart showing the details in step S13 in FIG. 4. Step S13 shown in FIG. 4 includes a plurality of steps, as shown in FIG. 5. Referring to FIG. 5, it is checked in step S21 if a user selects the half tone mode by operating the key 29-3. If it is determined in step S21 that the half tone mode is selected, the flow advances to step S22; otherwise, the flow advances to step S23. In step S22, it is checked if an apparatus of destination is capable of receiving data in the JPEG mode. If YES in step S22, the flow advances to step S24; otherwise, the flow advances to step S23. In order to make such decision, whether or not an apparatus of destination can receive data in the JPEG mode may be determined by actually negotiating with the apparatus of destination, or information indicating whether or not an apparatus of destination can receive data in the JPEG mode may be registered in, e.g., an abbreviated dial. In step S23, JBIG MODE FLAG=1 is set; in step S24, JPEG MODE FLAG=1 is set. Thereafter, the flow returns to NO or YES in step S13 in the routine shown in FIG. 4.

Figure 6:
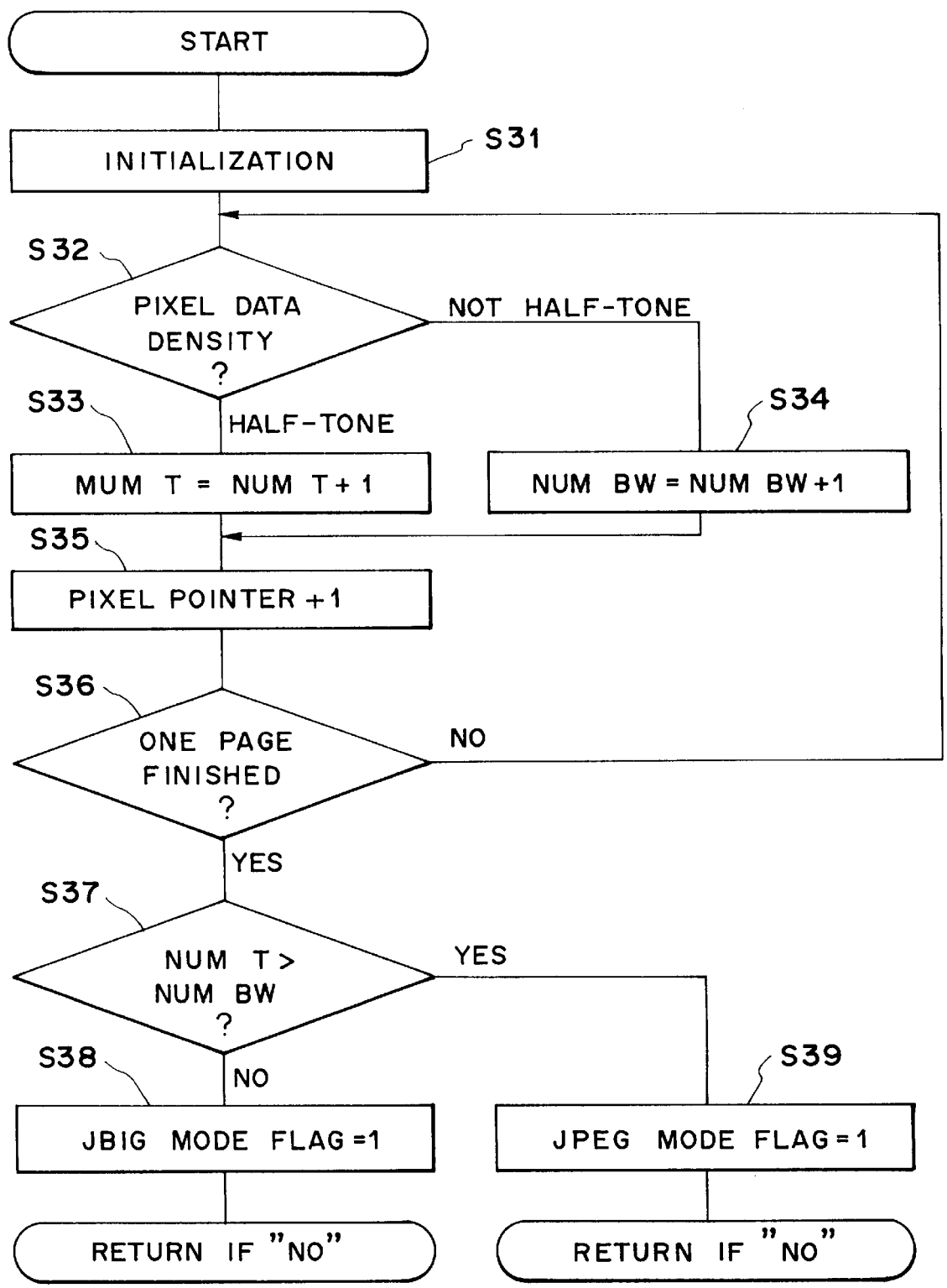
FIG. 6 is a flow chart showing an operation of the embodiment shown in FIG. 1.
Figure 7:
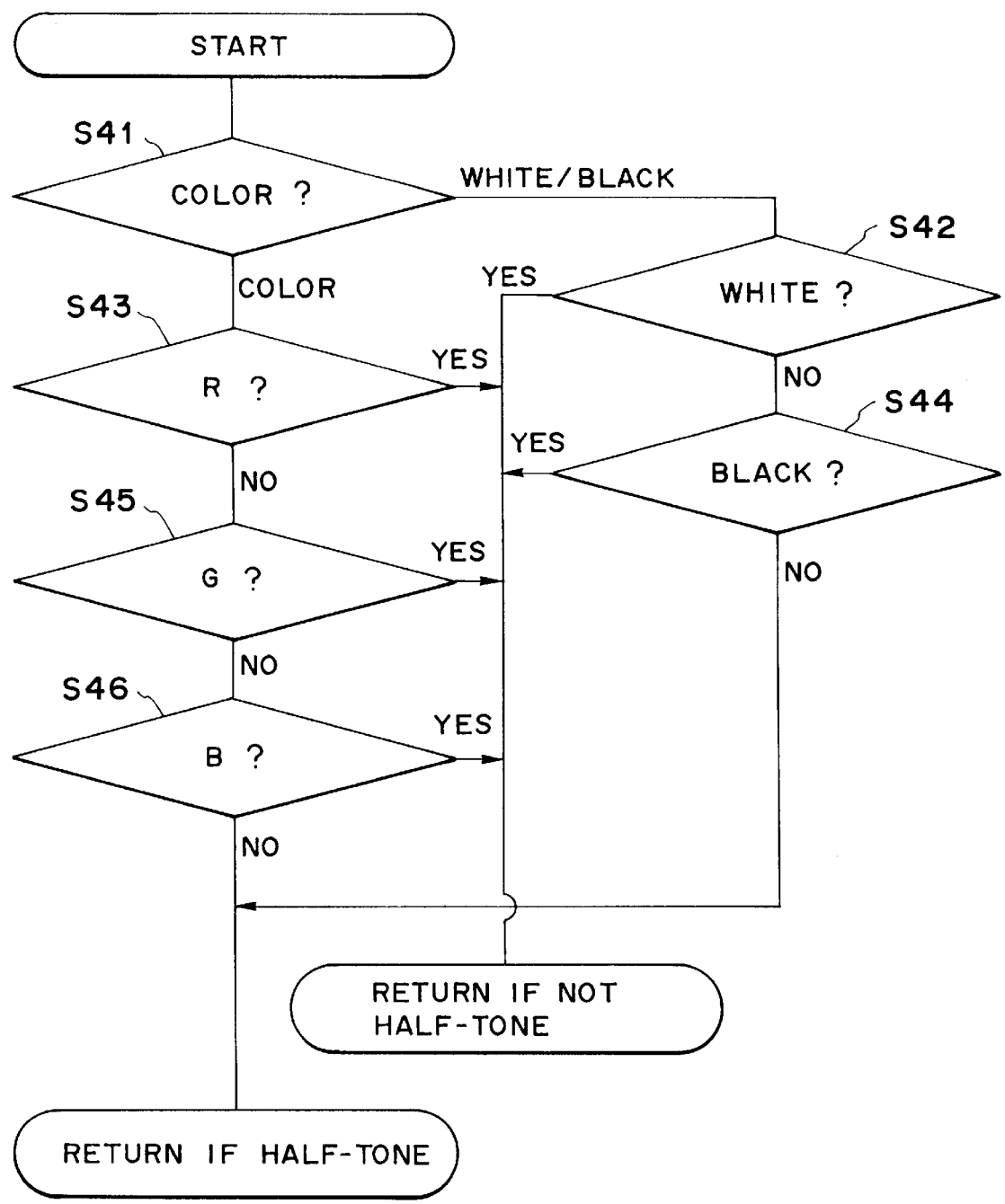
FIG. 7 is a flow chart showing an operation of the embodiment shown in FIG. 1.

In this embodiment, the JPEG or JBIG transmission mode is selected according to whether or not an apparatus of destination can receive data in the JPEG mode. FIG. 6 is a flow chart for step S13 in FIG. 4 when the JBIG or JPEG mode is automatically selected in accordance with the characteristics of a read image. In step S31, parameters are initialized, and registers NUM T and NUM BW (to be described later) are reset to zero. The ratio of a half tone image to an image for one page is checked in a loop consisting of step S32→step S33/S34→step S35→step S36→step S32. For this purpose, the density of one pixel is checked in step S32. FIG. 7 is a flow chart showing the details of step S32.

Referring to FIG. 7, it is checked in step S41 if the transmission mode is a color mode. This decision is made by checking if a user depresses the color setting switch 29-4 shown in FIG. 2. If the color setting key is not depressed, i.e., if the transmission mode is the black/white mode, the flow advances to step S42. In step S42, it is checked if the pixel of interest is a white pixel (i.e., has the highest luminance in 64 gradation levels stored in the memory). If YES in step S42, the flow returns to "not half-tone". If NO in step S42, the flow advances to step S44 to check if the pixel of interest is a black pixel (i.e., has the lowest luminance in 64 gradation levels). If NO in step S44 (i.e., the pixel=gray), the flow returns to "half-tone". If it is determined in step S41 that the transmission mode is the color mode, the flow advances to step S43. If it is determined in step S43, S44, or S45 that the pixel of interest is an R (red), G (green), or B (blue) pixel, i.e., if the read image is a monochrome image even if the color mode is set as the transmission mode, the flow returns to "not half-tone". If NO in all of steps S43, S44, and S45 (i.e., the pixel is a half-tone color pixel), the flow returns to "half-tone". Referring back to FIG. 6, if it is determined in step S32 that the pixel is a half-tone pixel, the pixel pointer is incremented by setting NUM T=NUM T+1 in step S33; if it is determined in step S32 that the pixel is not a half-tone pixel, the pixel pointer is incremented by setting NUM BW=NUM BW+1 in step S34. If pixels for one page are classified into half-tone pixels and non-half-tone pixels, the flow advances from step S36 to step S37. Whether or not one page is finished can be determined in step S36 by a method normally adopted in a facsimile apparatus. If all pixels for one page are counted, the number of half-tone pixels is compared with the number of non-half-tone pixels in step S37. If the number of half-tone pixels is larger than the number of non-half-tone pixels, the flow advances to step S39, and the JPEG MODE FLAG is set to be 1. Thereafter, the flow returns to "NO" in step S13 in FIG. 4. If the number of half-tone pixels is smaller than the number of non-half-tone pixels, the flow advances to step S38, and the JBIG MODE FLAG is set to be 0. Thereafter, the flow returns to "YES" in step S13 in FIG. 4.

As described above, the flow returns from FIG. 6 to step S13 in FIG. 4.

An image data quantity of this embodiment to be stored in the RAM 4 in FIG. 1 will be described below with reference to FIG. 8. P01 represents a photographic original, P02 represents a document original, and P03 represents a document original. In an example for contrast, since the first page is a photographic original, originals P02 and P03 are also transmitted in the JPEG mode. In this embodiment, however, the photographic original P01 is transmitted in the JPEG mode, and the document original P02 is transmitted in the JBIG mode.

As can be understood from FIG. 8, according to the method of this embodiment, the memory capacity can be saved. Therefore, more image data can be stored in the memory.

(Another Embodiment)

In the above embodiment, the JPEG coding/decoding LSI 8 and the JBIG coding/decoding LSI 9 are arranged to respectively perform corresponding coding/decoding operations, as shown in FIG. 1. If the CPU 2 has high processing performance (e.g., a 32-bit RISC chip), the CPU 2 can realize JPEG and JBIG coding/decoding operations in a software manner without arranging the LSIs 8 and 9. In the embodiment shown in FIG. 1, a low-cost CPU (16 bits, CISC) having lower processing performance is used.

Another embodiment of the present invention will be described below with reference to FIGS. 13 and 14. In this embodiment, the same reference numerals denote elements having the same functions as in FIGS. 11 and 12, and a detailed description thereof will be omitted. This embodiment discloses an apparatus for performing arithmetical coding in Huffman coding in the JPEG coding mode.

Figure 13:
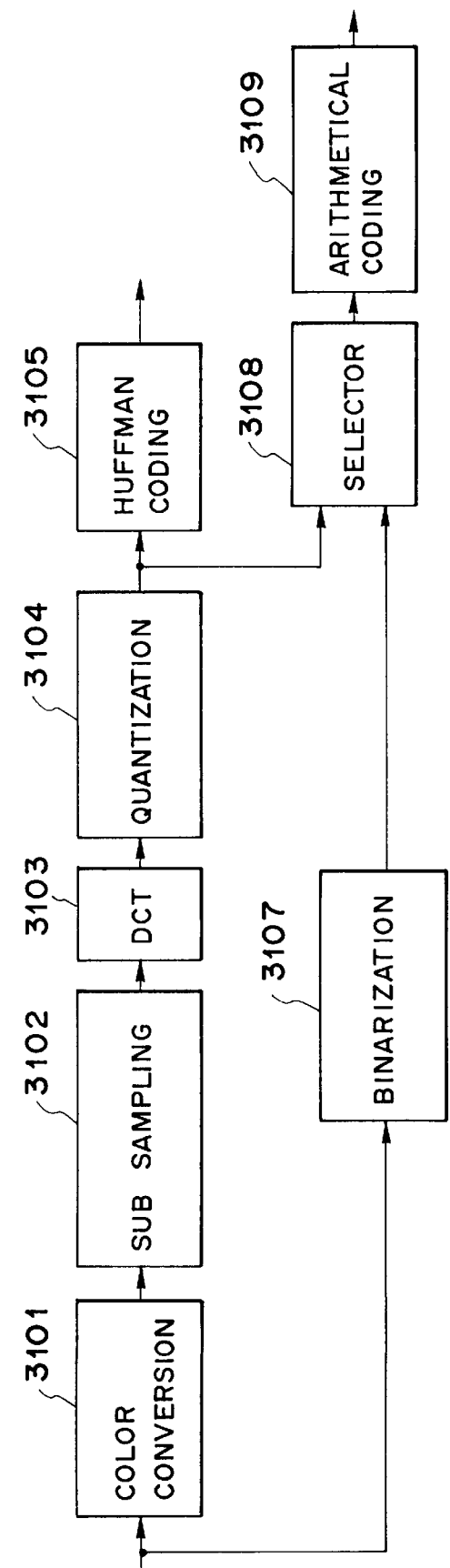
FIG. 13 is a diagram showing an arrangement of an encoder according to another embodiment of the present invention.

Referring to FIG. 13, a binarization circuit 3107 binarizes input image data. This circuit may adopt a binarization method called a density preservation method or may adopt another simple binarization method.

A selector 3108 selects an output from the quantization circuit 3104 or an output from the binarization circuit, and outputs the selected output to a hierarchical coding circuit 3109. When the output from the quantization circuit 3104 is quantized, multi-value data obtained by quantization is classified in units of bit planes, and is output to the hierarchical coding circuit 3109 in units of classified bit planes. More specifically, the hierarchical coding circuit 3109 is used in place of the Huffman coding circuit 3105, thereby improving the compression ratio.

Figure 14:
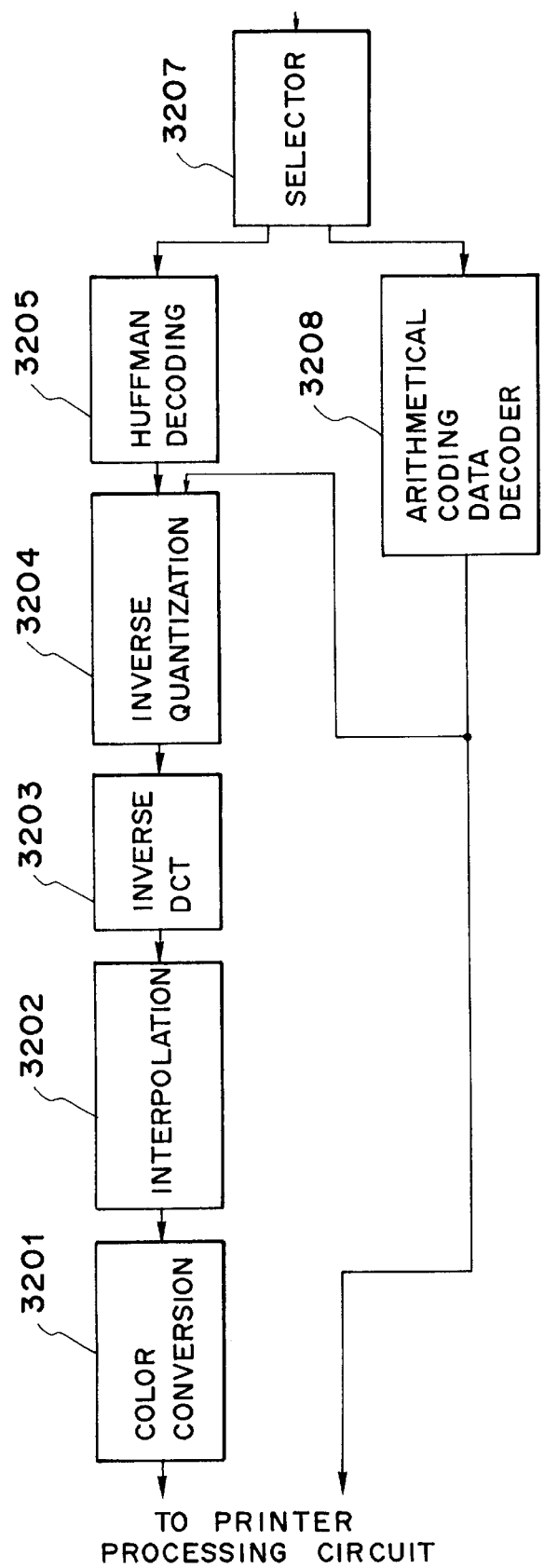
FIG. 14 is a diagram showing an arrangement of a decoder according to the embodiment shown in FIG. 13.

Referring to FIG. 14, a selector 3207 switches a system to which image data is output in accordance with whether or not the input signal is DCT-converted data. A hierarchical decoding circuit 3208 decodes data coded by the hierarchical coding circuit 3109.

In this embodiment, since an encoder for performing arithmetical coding after DCT-converted multi-value data is quantized is commonly used as an encoder for performing arithmetical coding of binary data, the arrangement can be simplified.

In the receiving side, since data is expanded using a circuit for decoding arithmetically coded data, the arrangement can also be simplified.

According to this embodiment, since the coding mode can be switched between the JPEG and JBIG coding modes in accordance with the characteristics of an image to be transmitted, deterioration of image quality can be prevented, and an image data communication can be performed at high speed.

As described above, according to this embodiment, since the coding mode (JBIG or JPEG) can be selected for each image, the communication time can be shortened as compared to a case wherein originals including both photographic originals and document originals are all transmitted in the JPEG mode. Also, image quality of the photographic original can be improved as compared to the case wherein all these originals are transmitted in the JBIG mode.

Note that the present invention is not limited to the JPEG method as an irreversible coding method. For example, vector quantization may be adopted, or run-length coding may be performed after DCT conversion.

According to this embodiment, when a plurality of pages are transmitted, since binary hierarchical coding or irreversible coding is selected in units of pages, proper coding can be selected in correspondence with the characteristics of an image to be transmitted.

According to this embodiment, since arrangements for executing irreversible coding and hierarchical coding partially include common elements, coding can be performed by a simple arrangement.

In this case, the Huffman coding circuit 3105 and the Huffman decoding circuit 3205 shown in FIGS. 13 and 14 may be omitted.

More specifically, even in the JPEG coding mode, arithmetical coding may be performed in place of Huffman coding.

What is claimed is:

1. An image processing apparatus comprising:
    manually operable means for designating a mode of said apparatus from among a plurality of modes, for each page of image data to be coded;
    discrimination means for discriminating for each page of the image data, in a case where said manually operable means designates a mode in which irreversible non-hierarchical coding is available, whether it is desirable to code said page of the image data by the irreversible non-hierarchical coding, thereby obtaining a discrimination result, said discrimination means including means for detecting a ratio at which each page is occupied by half-tone image data and using the ratio in obtaining the discrimination result;
    coding means for performing binary hierarchical coding and irreversible non-hierarchical coding for input image data; and
    control means for controlling said coding means to perform one of said binary hierarchical coding and said irreversible non-hierarchical coding for each page of the input image data on the basis of the discrimination result from said discrimination means.

2. An apparatus according to claim 1, wherein said binary hierarchical coding is a JBIG method.

3. An apparatus according to claim 1, wherein said irreversible non-hierarchical coding is a JPEG method.

4. An apparatus according to claim 1, further comprising:
    transmission means for transmitting data coded by said coding means.

5. An apparatus according to claim 1, further comprising:
    generation means for generating image data to be coded by said coding means.

6. An apparatus according to claim 5, wherein said generation means comprises an original reader.

7. An apparatus according to claim 1, wherein said manually operable means includes instruction means for instructing to set a photographic mode.

8. An apparatus according to claim 7, wherein when said instruction means instructs to set the photographic mode, and wherein said control means controls so that said coding means is able to select said irreversible non-hierarchical coding.

9. An apparatus according to claim 1, wherein said discrimination means discriminates whether or not said input image data is half-tone data.

10. An apparatus according to claim 1, wherein when said discrimination means discriminates that said input image data includes half-tone image data at more than a predetermined ratio for each page, said control means controls said coding means to select said irreversible non-hierarchical coding for the image data of a corresponding page.

11. An image communication apparatus comprising:
    manually operable means for designating a mode of said apparatus from among a plurality of modes, for each page of image data to be coded;
    discrimination means for discriminating for each page of the image data, in a case where said manually operable means designates a mode in which irreversible non-hierarchical coding is available, whether it is desirable to code said page of the image data by the irreversible non-hierarchical coding, thereby obtaining a discrimination result, said discrimination means including means for detecting a ratio at which each page is occupied by half-tone image data and using the ratio in obtaining the discrimination result;
    selecting means for selecting one of a binary hierarchical coding method and an irreversible nonhierarchical coding method for each page upon continuous transmission of a plurality of pages of images on the basis of the discrimination result from said discrimination means; and
    communication means for performing a communication of data coded by the selected coding method.

12. An apparatus according to claim 11, wherein said binary hierarchical coding method is a JBIG method.

13. An apparatus according to claim 11, wherein said irreversible non-hierarchical coding method is a JPEG method.

14. An apparatus according to claim 11, wherein said manually operable means includes instruction means for instructing to a set a photographic mode.

15. An image processing apparatus comprising:

manually operable means for designating a mode of said apparatus from among a plurality of modes, for each page of image data to be coded;

discrimination means for discriminating for each page of the image data, in a case where said manually operable means designates a mode in which irreversible coding is available, whether it is desirable to code said page of the image data by the irreversible coding, thereby obtaining a discrimination result, said discrimination means including means for detecting a ratio at which each page is occupied by half-tone image data and using the ratio in obtaining the discrimination result;

first encoding means for performing binary coding of image data conformable to a JBIG method;

second encoding means for performing irreversible coding of image data in units of blocks of the image data, each of the blocks being composed of (N×M) pixels, with N and M being integers $\geq 2$; and selecting means for selecting one of said first and second encoding means for coding each page of the image data on the basis of the discrimination result from said discrimination means.

16. An apparatus according to claim 15, wherein the irreversible coding conforms to a JPEG method.

17. An apparatus according to claim 15, further comprising a reader for reading an original to form the image data.

18. An apparatus according to claim 15, wherein said manually operable means includes instruction means for instructing to set a color mode, and when said instruction means instructs to set the color mode said selecting means is able to select said second encoding means for coding the image data.

19. An apparatus according to claim 15, further comprising detecting means for detecting a density of the image represented by the image data, and wherein said selecting means selects based on an output of said detecting means.

20. An image processing apparatus comprising:

manually operable means for designating a mode of said apparatus from among a plurality of modes, for each page of image data to be coded;

first encoding means for encoding image data, said first encoding means including conversion means for converting a resolution of the image data;

second encoding means for encoding image data, said first encoding means including conversion means for converting the image data into coefficients in a frequency space;

discrimination means for discriminating for each page of the image data, in a case where said manually operable means designates a mode in which encoding by said second encoding means is available, whether it is desirable to code said page of the image data by said second encoding means, thereby obtaining a discrimination result, said discrimination means including means for detecting a ratio at which each page is occupied by half-tone image data and using the ratio in obtaining the discrimination result; and selecting means for selecting one of said first and second encoding means for coding each page of the image data on the basis of the discrimination result from said discrimination means.

21. An image processing apparatus comprising:

manually operable means for designating a mode of said apparatus from among a plurality of modes, for each page of image data to be coded;

first encoding means for encoding image data, said first encoding means performing binary coding conformable to a JBIG method for the image data;

second encoding means for encoding of image data in units of blocks of the image data, each of the blocks being composed of (N×M) pixels, with N and M being integers $\geq 2$; and discrimination means for discriminating for each page of the image data, in a case where said manually operable means designates a mode in which encoding by said second encoding means is available, whether it is desirable to code said page of the image data by said second encoding means, thereby obtaining a discrimination result, said discrimination means including means for detecting a ratio at which each page is occupied by half-tone image data and using the ratio in obtaining the discrimination result;

selecting means for selecting one of said first and second encoding means for coding each page of the image data on the basis of the discrimination result from said discrimination means.

* * * * *

UNITED STATES PATENT AND TRADEMARK OFFICE
CERTIFICATE OF CORRECTION

PATENT NO. : 5,911,010
DATED : June 8, 1999
INVENTOR(S) : TOSHIFUMI NAKAJIMA

It is certified that error appears in the above-identified patent and that said Letters Patent is hereby corrected as shown below:

In the Drawing:

SHEET 2

FIG. 2, "POSE" should read --PAUSE--.

COLUMN 9

Line 3, "a set" should read --set--.

Signed and Sealed this

Twenty-eighth Day of March, 2000

Attest:

Q. TODD DICKINSON

Attesting Officer     Commissioner of Patents and Trademarks